(12) United States Patent
Brok et al.

(10) Patent No.: US 7,089,489 B1
(45) Date of Patent: Aug. 8, 2006

(54) METHOD AND ARRANGEMENT FOR BROWSING DOCUMENTS IN A DATABASE

(75) Inventors: Jacco Brok, Espoo (FI); Rune Granö, Espoo (FI); Ulf Vikström, Helsinki (FI); Kenneth Österberg, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/450,941

(22) Filed: Nov. 29, 1999

Related U.S. Application Data (63) Continuation of application No. PCT/FI98/00467, filed on Jun. 1, 1998.

(30) Foreign Application Priority Data

Jun. 2, 1997 (FI) ..................... 972335

(51) Int. Cl.
*G06F 17/00* (2006.01)
(52) U.S. Cl. .............. 715/511; 707/2; 707/4; 707/203; 715/501.1
(58) Field of Classification Search ............ 715/501.1, 715/523, 522, 911, 511; 707/2, 4, 203
See application file for complete search history.

(56) References Cited

U.S. PATENT DOCUMENTS

| | | | | |
|---|---|---|---|---|
| 5,572,643 A | * | 11/1996 | Judson | 709/218 |
| 5,884,310 A | * | 3/1999 | Brichta et al. | 707/10 |
| 5,890,171 A | * | 3/1999 | Blumer et al. | 715/501.1 |
| 5,937,406 A | * | 8/1999 | Balabine et al. | 707/100 |
| 6,041,323 A | * | 3/2000 | Kubota | 707/5 |
| 6,055,538 A | * | 4/2000 | Kessenich et al. | 707/101 |
| 6,345,303 B1 | * | 2/2002 | Knauerhase et al. | 709/238 |
| 6,667,747 B1 | * | 12/2003 | Spellman et al. | 345/714 |

FOREIGN PATENT DOCUMENTS

| | | | |
|---|---|---|---|
| DE | 000762297 A2 | * | 5/1996 |
| EP | 0 388 050 A2 | | 9/1990 |
| EP | 0 762 297 A2 | | 9/1996 |
| EP | 0 747 842 A1 | | 12/1996 |
| WO | 91/14992 A1 | | 10/1991 |
| WO | 97/09680 A1 | | 3/1997 |
| WO | 97/15018 A1 | | 4/1997 |

OTHER PUBLICATIONS

WinZip Helpfile, Nico Mak Computing, Inc., Copyright 1996, pp. 1-14.*

* cited by examiner

*Primary Examiner*—Stephen Hong
*Assistant Examiner*—Matthew Ludwig
(74) *Attorney, Agent, or Firm*—Nixon & Vanderhye P.C.

(57) ABSTRACT

The present invention relates to methods and arrangements for browsing documents stored in a database or several databases. At least one of said documents is including references to other documents and/or files in the database or several databases. The browsing comprises steps for retrieving of a desired document from the database(s) as response to a request for that document by browsing means, a dynamic transforming of the references of said retrieved document from a special syntax to a form said browsing means is capable of understanding, and transmitting the referenced documents and/or files to said browsing means.

35 Claims, 4 Drawing Sheets

METHOD AND ARRANGEMENT FOR BROWSING DOCUMENTS IN A DATABASE

FIELD OF THE INVENTION

This is a continuation application of the PCT application PCT/FI98/00467, filed on Jun. 1, 1998, claiming priority from Finnish application number 972335, filed on Jun. 2, 1997. The disclosure of that PCT application is incorporated herein by reference.

The present invention relates to a method of browsing documents stored in a database. The invention relates further to an arrangement for performing the browsing operations.

BACKGROUND OF THE INVENTION

There are several known techniques for storing a large number of documents in a database. A single document in the database may contain references to other documents and for instance to image (graphics) files and/or sound files of the same or even to a separate database.

An example of the kind of document stored in such a database is an HTML document (HyperText Markup Language) ie. the "hyperdocument", which is widely used in an Internet environment. The "Internet" is a worldwide network of computers capable of communication with each other by means of a suitable protocol, such as TCP/IP (Transmission Control Protocol/Internet Protocol). During recent years the use of the Internet has expanded rapidly, especially after the introduction of so called Web browsers which allow a simple graphical user interface based (GUI) access to network servers supporting HTML documents.

Typically, a database of HTML documents is stored on a Web server connected to the WWW (World Wide Web). The WWW can be understood in turn as a collection of servers connected to the Internet, which utilise so-called HyperText Transfer Protocol (HTTP). This HTTP in turn utilises said HTML standard page description.

It is possible to browse separate documents in given locations by a suitable terminal device, ie. a "Web browser", which can consist of a microcomputer or a workstation. When the Web browser is connected to the WWW, a Web server receives an URL (Uniform Resource Locator) request from the browser, decodes the URL, handles the document files and sends the requested files to the Web browser.

It is also possible to browse documents locally, ie. in a local file system of a data processing device which may not be connected to the WWW—i.e. a so called stand-alone data processing device. In this case, the document address (ie. a local file path) is given to the local file system which then retrieves the file for the browser. By using relative document references it is possible to transfer the whole document collection to a different location without any modifications to the documents itself.

SUMMARY OF THE INVENTION

The above arrangements involve some problems. Existing browsing means, eg. Web browsers, are not enabled to browse a document database which consists of a set of documents stored as a single file. Rather, the browser can only access separate documents located at a given address (URL). However, a large collection of such individual documents, such as thousands of documents, is not easily managed. A single file could be managed far more easily than a large collection of separate files, which files may even be of different types. A single file could also be more easily given a product identity and a version identifier, and the quality of the information contained in the database could be guaranteed through proper version handling.

As the documents in a single file database typically contain links to other documents in the database, a problem arises in enabling the transfer of the database to different locations while keeping the database in a manageable condition even in these different locations. In other words, a problem lies in the defining and handling of the document links so that a location independent database can be achieved. It would be a further advantage if the single file database could be defined such that the same arrangement could be used both in network use (the same database could be copied to any network server) and in a local file system, such as in a stand alone microcomputer (the same database could be copied to any file path in the file system).

Therefore, it is an object of the present invention to overcome the disadvantages of the prior art solutions and to provide a new type of solution for browsing of documents stored in a single file database.

An object of the present invention is also to provide a browsing method and arrangement by means of which it is possible to have a complete document database (eg. a document library, a document archive etc.), which is formed as a single file, which enables the browsing of this database in a network environment and/or in a stand-alone data processing device.

An object of the present invention is also to provide a method and arrangement in which the document references are defined and handled such that a location independent single file database is achieved.

It is also an object of the present invention to provide a database arrangement and method which can be utilised both in a network environment and in a stand-alone data processing device, and in addition such that the documents are usable in both occasions. A further object is an arrangement for this in which two programs can handle such a database.

Other objects and advantages of the present invention will be brought out in the following part of the specification taken in conjunction with the accompanying drawings.

The objects are obtained by the disclosed method for browsing documents stored in a database. In said method at least one of said documents includes references to other documents in the database, and the browsing comprises steps for retrieving of a desired document from the database in response to a request for that document by browsing means, dynamically transforming the references of said retrieved document from a special syntax to a form said browsing means is capable of understanding, and transmitting the referenced documents to said browsing means.

According to an aspect of the present invention there is provided a method of browsing a set of documents stored electronically as a single file, at least one of the documents containing links to others of the documents, the method comprising:

retrieving said at least one document from the database in response to a request for that document by an electronic document browsing means;

scanning the retrieved document to identify said links;

transforming the links into a format which is recognisable by the document browsing means; and transmitting the retrieved document including said transformed links to the browsing means.

According to this aspect of the invention, it is possible to provide a database as a single file which can be easily handled, i.e. stored, copied, etc. This avoids individual documents being confused, lost, or inadvertently amended.

The database may be stored in a compressed form, e.g. as a ZIP file. By providing for the transformation of internal document links into, for example, URLs, these links are made independent of the actual storage location of the database. The transformation is handled by a proprietary "interface" application.

It is to be understood that the term "document" used above is intended to indicate a variety of different forms and is not limited to text documents. For example, documents may include images, video and audio sequences, and graphics.

According to an embodiment of the invention, a method is disclosed for browsing documents stored in at least two databases connected to each other by communication means, wherein at least one of said documents is including references to other documents and/or files in one or several of the databases. The browsing comprises steps for retrieving of a desired document from at least one of the databases as response to a request for that document by browsing means, a dynamic transforming of the references of said retrieved document from a special syntax to a form said browsing means is capable of understanding, and transmitting the referenced documents and/or files to said browsing means.

According to a preferred embodiment, an arrangement is provided for browsing documents stored in a database, wherein at least one of said documents to be browsed includes references to other documents and/or files in the database, the arrangement comprises browsing means, means for retrieving a desired document from the database and for accomplishing a dynamic transformation of the references of said desired document from a special syntax to a form said browsing means is capable of understanding, and means for transmitting said referenced documents and/or files to said browsing means.

A further embodiment discloses a method for browsing operation and maintenance documents for telecommunication systems stored in a database, at least one of said documents including references to other documents and/or files in the database, wherein the browsing comprises retrieving of a desired document from the database as response to a request for that document by browsing means, a dynamic transforming of the references of said retrieved document from a special syntax to a form said browsing means is capable of understanding, and transmitting the referenced documents and/or files to said browsing means.

Several advantages are obtained by means of the present invention, since the solution provides a simple, reliable and controllable manner for document browsing. The solution provides an automatic and transparent linking of various different documents. The document database to be browsed is provided in a form of a complete document database. It also enables the use of one single database in different situations, such as in a network (eg. world wide Web of the Internet) and standalone (eg. PC) use, and on different physical locations without a need to be modified. This all provides an improved and eased administration and maintenance of such databases compared to those having thousands of separate documents of various types.

In the following the present invention and the other objects and advantages thereof will be described by way of an example with reference to the annexed drawings, in which similar reference characters throughout the various Figures refer to similar features. It should be understood that the following description of an example of the invention is not meant to restrict the invention to the specific forms presented in this connection but rather the present invention is meant to cover all modifications, similarities and alternatives which are included in the spirit and scope of the present invention, as defined by the appended claims.

DETAILED DESCRIPTION OF CERTAIN EMBODIMENTS

Figure 2:
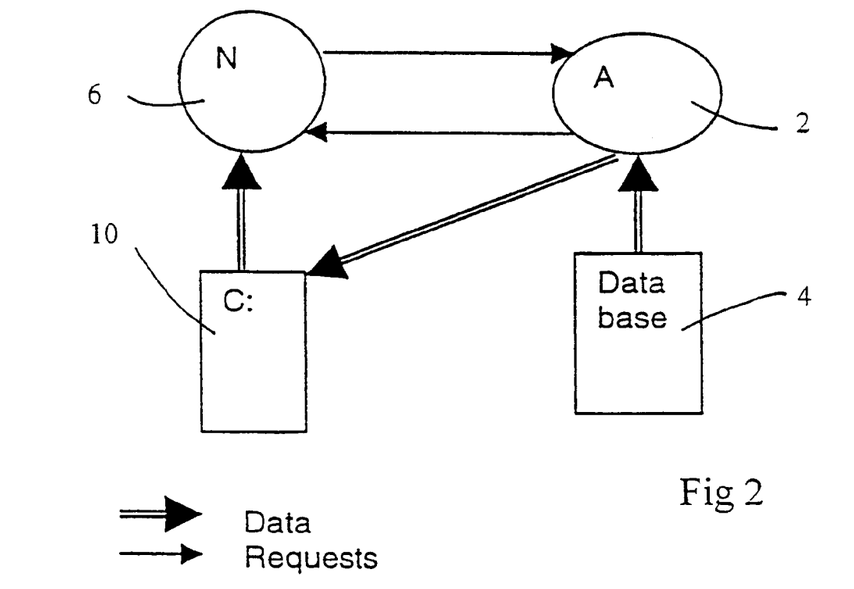
FIG. 2 is a schematic presentation of an arrangement according to one embodiment of the present invention for stand alone use.
Figure 3:
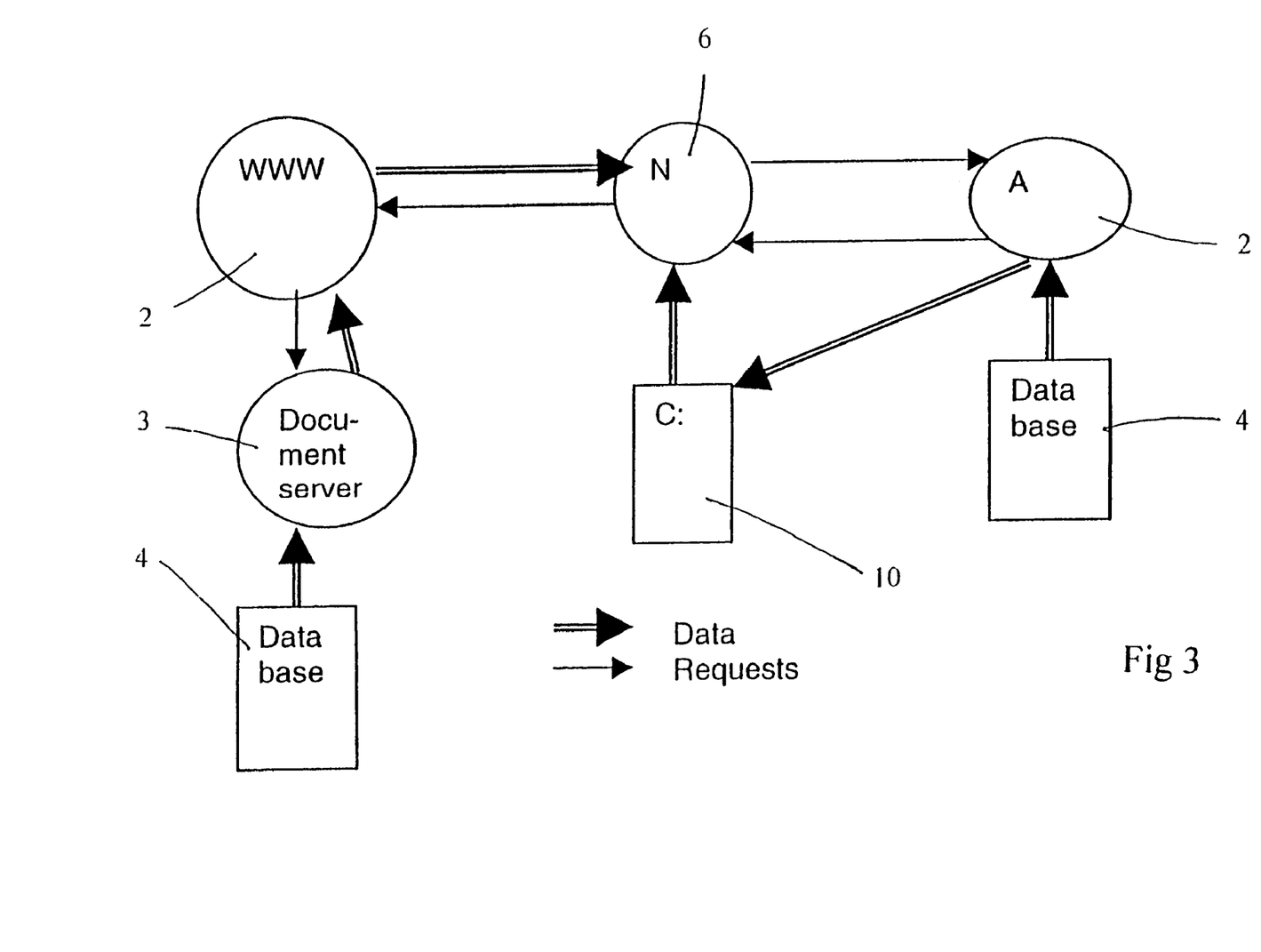
FIG. 3 is a schematic presentation of an arrangement embodying the present invention for both the network and stand alone use.

The present invention provides a new type of method and arrangement for browsing a database, either in a network environment, such as in the world wide Web (WWW) (FIG. 1), or in a stand-alone data processing device (FIG. 2) such as a microcomputer or personal computer (PC), or both (FIG. 3). The database can also be located in LAN (Local Area Network).

Suitable data processing devices or computers are per se known by the skilled person, and thus it is only mentioned herein that such apparatus usually comprises a central processing unit (CPU), memory means such as RAM (Random Access Memory) and ROM (Read Only Memory), and a display or corresponding means for presenting information to the user. A keypad and a mouse are provided for enabling the user to control and instruct the apparatus.

Figure 1:
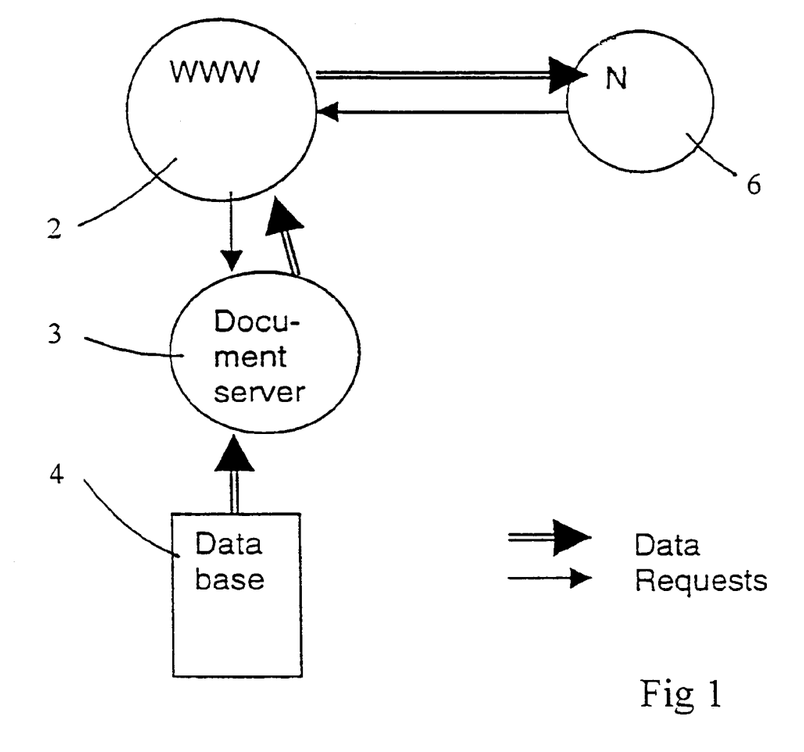
FIG. 1 is a schematic presentation of an arrangement embodying the present invention for network use.

FIG. 1 is a schematic presentation of one embodiment according to the present invention. In FIG. 1, a standard Web server (www server) is indicated by reference numeral 2. A document server 3 is arranged to handle a document database 4, and to transform document references in a manner to be described below. In FIG. 1, single lined arrows indicate requests and double lined arrows indicate data communication.

A Web browser 6 is arranged to communicate with the Web server means 2. The skilled person knows the operational principles and operation of different Web browsers, such as Netscape Navigator™ or Explorer™ by Microsoft Corp., and thus they are not explained in more detail herein. An advanced Web browsing system in connection with the Internet is also disclosed by U.S. Pat. No. 5,572,643 (Judson), which is incorporated herein by reference.

The communications between the WWW server 2 and the Web browser 6 is arranged to use http (hyper text transfer protocol) and a TCP/IP connection (Transport Control Protocol/Internet Protocol).

The document database 4 consists of a single ZIP file (i.e. with a single filename recognisable to the operating system of the document server) containing a number of HTML documents (HyperText Markup Language), ie. "hyperdocuments", which are listed in an index at the start of the database. A document may contain references to another document according to a specific syntax or format.

The document server 3 is provided with capability for managing the document database 4, and is arranged to dynamically transform references within the various documents from a specific syntax to a form which is understandable by the Web browser 6. One example of this kind of transforming operation is shown by a detailed exemplifying code listing included in this description.

In more detail, the Web (eg. World Wide Web: WWW) server 2 can be accessed through a graphic user interface, such as, eg. Mosaic™, Netscape™, Cello™ etc., for reading the HTML documents. In order to find the requested document to be browsed, the document reference or link sent from the Web browser 6 to the Web server 2 must be in a Uniform Resource Locator (URL) form. The URL has the following general syntax:

<protocol>:<address>?<data>#<name>

It is, however, to be understood that the above syntax is given only as an example, and that other possible syntaxes could also be used.

The browser 6 is provided with knowledge about a predefined set of protocols, and their respective protocol handlers. These protocols are per se known, and are such as the above mentioned 'http' (hyper text transfer protocol) and 'file'.

When the 'http' protocol is used, the address will be in the form of an Internet address (eg. lm.ericsson.se) and a pathname to the requested document in the Web server 2 (eg. /docs/doc.html). The request is routed over the Internet to a specified host machine which is positioned at the Internet address given to the URL. At the host machine, the Web server uses the pathname portion of the address to locate the requested document. The pathname may also specify a CGI (Common Gateway Interface) program to be executed, in which case the CGI program is responsible for returning the requested document to the Web server 2, which in turn will transmit it to the Web browser means 6 (the client) through the TCP/IP connection.

In the case where 'file' is used, the address is a local file path (eg. C:\mydir\doc.htm). The handler of this type of address is the local file system, which is capable of fetching the requested document on the basis of the given file path, and giving it to the Web browser 6 for displaying purposes.

In a specific case where a Netscape™ compatible browser is used, it is possible for an external program to define (name) a new protocol to the browser means 6. This external program implicitly becomes the protocol handler for this new protocol. When such a protocol has been defined, the browser sends requests (URLs) containing this protocol to the external program (eg. program A in FIG. 2). The external program will then become responsible for decoding this type of URL.

The document references in the documents included within the single file database contain a special protocol (named as 'edw') which is not automatically known by the browser means 6. For this reason certain transformations of the references (URLs) must take place before a document in the database can be located and given to the browser means 6 for display. The situation is the same both in network use (FIG. 1) and stand alone use (FIG. 2).

The following is discussed in view of these transformations. Reference is also made to the following exemplifying code listing:

```
In the database (4):-------------------------
<BODY BACKGROUND="edw:/alex?AC=image&FN=bopi_bg.gif">
<A NAME=TOP></A>
<IMG WIDTH="98%" HEIGHT=71 SRC="edw:/alex?AC=image&FN=bopihead.gif">
<P><BR>
<P>
<A NAME=CONTENTS><B>Contents</B></A>
<PRE>
    <A HREF="edw:/alex?FN=bopi_in1.html#CHAPTER1"><B>GENERAL,APT</B></A>
    <A HREF="edw:/alex?FN=bopi_in1.html#CHAPTER1.1">Administrative routines</A>
    <A HREF="edw:/alex?FN=bopi_in1.html#CHAPTER1.2">Product handling</A>
In Web browsing:--------------------------------
<BODY BACKGROUND="http://lm.ericsson.se/cgi-bin/alexserv?DB=aa33.alx&
AC=image&FN=bopi_bg.gif">
<A NAME=TOP></A>
<IMG WIDTH="98%" HEIGHT=71
SRC="http://lm.ericsson.se/cgi-bin/alexserv?DB=aa33.alx&AC=imag e&FN =bopihead.gif">
<P><BR>
<P>
<A NAME=CONTENTS><B>Contents</B></A>
<PRE>
    <A
HREF="http://lm.ericsson.se/cgi-bin/alexserv?DB=aa33.alx&FN=bopi_in1.html
#CHAPTER1"><B>GENERAL, APT</B></A>
    <A
HREF="http://lm.ericsson.se/cgi-bin/alexserv?DB=aa33.alx&FN=bopi_in1.html
#CHAPTER1.1">Administrative routines</A>
    <A
HREF="http://lm.ericsson.se/cgi-bin/alexserv?DB=aa33.alx&FN=bop
i_in1.html#CHAPTER1.2">Product handling</A>
In stand alone (PC) browsing:------------------------
<BODY BACKGROUND="file:///C:/TEMP/ALEX_TMP/aa33/alex0022.gif">
<A NAME=TOP></A>
<IMG WIDTH="98%" HEIGHT=71 SRC="file:///C:/TEMP/ALEX_TMP/aa33/alex0023.gif">
<P><BR>
<P>
<A NAME=CONTENTS><B>Contents</B></A>
<PRE>
    <A HREF="edw:/alex?FN=bopi_in1.html#CHAPTER1"><B>GENERAL. APT</B></A>
    <A HREF="edw:/alex?FN=bopi_in1.html#CHAPTER1.1">Administrative routines</A>
    <A HREF="edw:/alex?FN=bopi_in1.html#CHAPTER1.2">Product handling</A>
```

In view of above exemplifying listings, and when supposed that the address to a document in the database 2 is:
edw:/alex?FN=<doc name>, wherein <doc name> is the name of the referenced document. It is to be noted that the name of the database is not included in the address, since the user may rename the database file.

The address to the document that should be retrieved from a Web server has the following form:
http://<server address>/<server name>?FN=<doc name>&DB=<db name> wherein <server address> is the Internet address of the Web server in which the database is located, <server name> is the name of the server document program and <db name> is the name of the document database. When a document is retrieved from a Web located database, all URLs (both to other documents and to image files included in with document) the document contains must be transformed to the above described form.

In case the document is retrieved via the stand alone program, ie. via 'A' in FIG. 2, the document cannot be given directly to the browser means 6. This is a restriction of the external interface of the browser. Thus the document must be firstly stored as a file on a local storage means, such as a local hard disk (C:) 10. Therefore the address to the file retrieved in the stand alone mode has the following form:
file://C:\temp\<file name>, where 'C:\temp\' can be any local file path and 'file name' is the name of the temporary file containing the actual requested document. When a certain document is retrieved from a single file database 4, all such URLs which make a reference to other documents in the database can be left as they are, since they will be decoded in due course by stand alone program 'A' at 12. However, all the references the document makes to image files must be transformed to the above form, as the browser means 6 expects them to be immediately available. This is because of the external interface of the browser, which sets a restriction according to which the mechanism for requesting URLs from the external program works only for complete documents, and not for images included in a certain document. Thus the external program 'A' must retrieve all images the document contains simultaneously, as it retrieves the text file of the document.

It is to be understood that all shown means of FIG. 2 are preferably disposed with a single data processing device such as a PC. The database 4 may also be a part of a LAN network (Local Area network).

Now, after having described the formations, the actions to be taken by the document browsing arrangement will be described in more detail for both the network version and the stand alone version, respectively.

The operation in network environment will be discussed first referring again to FIG. 1. The operation is initiated by taking a connection to document server 3. A list of databases including the database 4 is given through the display of the browser 6, whereafter the user may select the desired database (database 4 in the example). Thereafter a supposition document from the selected database is displayed (eg. the document of FIG. 5). The document server 3 receives then a request for a certain document from the browser means 6 via Web server means 2, as is indicated by the single lined arrows. The document server retrieves then the document from the database 4 using the database index.

The document is first unzipped and is then scanned by the document server to identify all references to other documents in the database. These references are then transformed from the proprietary edw references into 'http' form references including the actual address to the document server and the database name. The document is then given to the Web server 2, which transmits it further to the browser means 6, as is indicated by the double lined arrows, respectively.

The browser means 6 loads the document and upon finding references to possible image files sends out a new request to retrieve each of the referenced image files and similar. Since the reference to a certain image file is an http link, each reference will generate a new request for the document server 3 to retrieve and unzip the image file (or any other possible referenced file).

Figure 4:
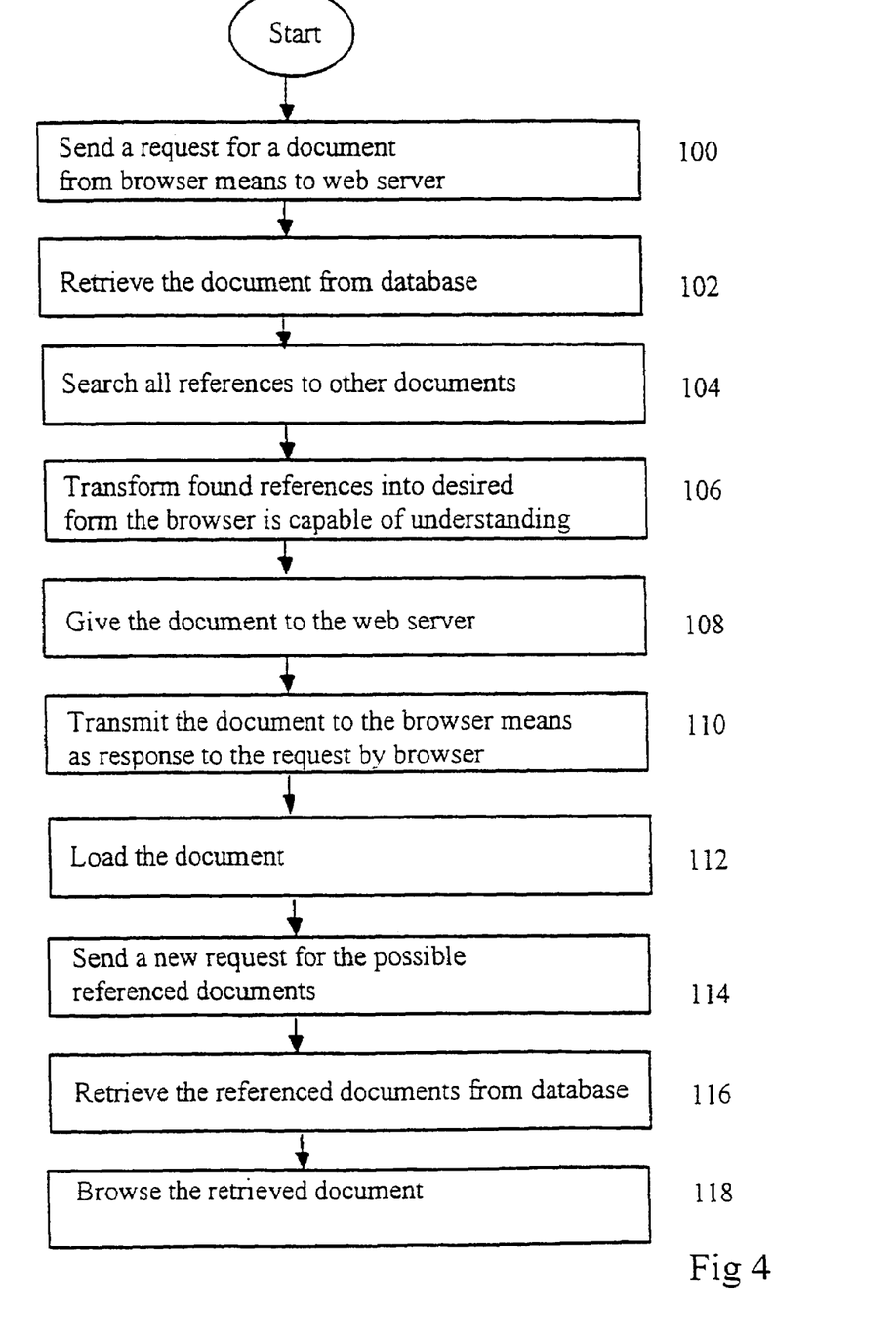
FIG. 4 discloses an exemplifying flow chart of the operations in Web use according to one embodiment of the present invention.

The operation steps for the network use are also illustrated by the flow chart of FIG. 4. At step 100 the browser means send a request for a certain document to the Web server. The document is then retrieved from the database by means of the document server, step 102. After unzipping the document, the references to other documents and/or files are searched, step 104. In the next step (106), the syntaxes of the found references are transformed by means of the document server into a form the browser is capable of understanding. Thereafter the document is given to the Web server and is further transmitted to the browser means as a response to the request (steps 108 and 110, respectively). The document is loaded into the browser, step 112, and possible requests for the additional referenced documents are sent to the Web server, step 114. These are retrieved from the database (or several databases), unzipped, and returned in a corresponding manner to the browser, step 116.

Figure 5:
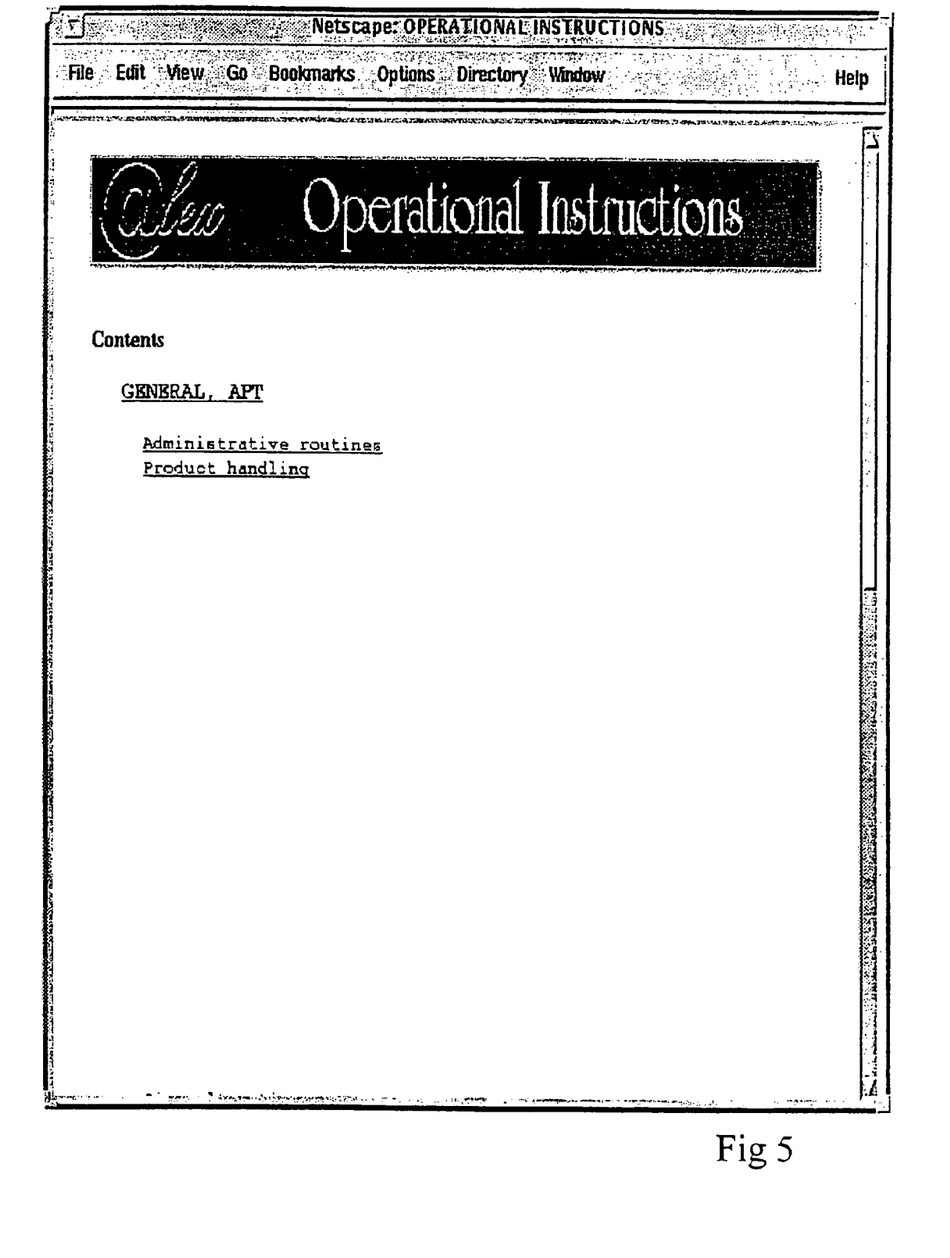
FIG. 5 discloses one example of a page displayed to the user.

The document is now retrieved to the browser means 6 and displayed by the display means thereof, step 118. One example of such a document is shown in FIG. 5. The documents and/or files can be browsed locally at the browser. As shown in FIG. 5, the document may contain some additional references shown to the user which are of the above mentioned http type, and thus when the user 'clicks' eg. by the mouse or buttons of the keypad one or several of the references, the whole process will begin again.

In the stand alone use (FIG. 2), the operation can be described in the following manner. The user starts program 'A' which starts the actual program in case it is not already running. The program 'A' defines itself to the browser 6 as the handler for the 'edw' protocol and will receive all requests that are based on this protocol. So when the user clicks on a reference which is utilising the 'edw' protocol, the whole URL is sent to the program 'A'. The URL contains the name of the document to be retrieved.

The document is retrieved from the database, unzipped, and possible links to image files or the like are searched and the found file links are transformed to 'file:/' links. Simultaneously the image and other possible files are retrieved from the database and stored on the local file system in a place which corresponds to the 'file:/' links inserted into the document. The text document is given a file name and stored to the local hard disk 10. Finally the browsing means 6 is instructed to load the file from with hard disk 10.

The browsing means 6 loads the file and upon finding searched references to the appropriate files it loads also these into the window or display of the browsing means 6. The document in the browser display contains now the document references of the 'edw' type described above, and thus, when the user clicks on one of them a new request will be generated to the external program A. Thus the stand alone data processing device is capable of handling the document database, to communicate with the browser's external interface and to transform the references to the image file documents or similar from their special syntax to a form which the browser is able to understand.

FIG. 3 illustrates the possibility of using both of the above described arrangements. This could be the case, eg. with portable computers which may be connected for most of the time to the communications network, but are occasionally used as stand-alone computers.

According to the present invention, it is possible to transmit several documents and/or files from more than one database as a single unit from the Web server to the browsing means.

According to one embodiment the files are transmitted and handled as a single compressed file during the retrieving operations. The compressing may be accomplished, eg. by means of a well known ZIP program.

The invention enables the use of one single database in different situations, such as in a network and stand-alone use, and on different physical locations without a need to be modified. This provides an improved and eased administration and maintenance of such databases.

Thus one preferred use for the inventive solution is browsing of operation and maintenance documents for telecommunication equipment (eg. AXE O&M documents, AXE being a trademark of Telefonaktiebolaget L M Ericsson for an exchange by the same). An advantage to the operator is that only one single document database is required to be installed in one single location in the Intranet of the operator, whereafter the documentation will become available throughout the whole organisation. On the other hand, when a service person is going to go to, eg. accomplish some repairs in an exchange at which no Web connections are available, the service person can have the latest documentation in a stand-alone portable computer he/she is carrying.

Thus, the invention provides an apparatus and a method by which a significant improvement can be achieved in the area of Web browsing. It is to be noted that the foregoing examples of the embodiments of the invention are not intended to restrict the scope of the invention defined in the appended claims. All additional embodiments, modifications and applications obvious to those skilled in the art are thus included within the spirit and scope of the invention as set forth by the claims appended hereto.

The invention claimed is:

1. A method of browsing a database consisting of a set of documents stored electronically as a single file using a single file database format, at least one of the documents containing links to others of the documents, each link identifying one other document in the database and useable to retrieve said other document from the database, the method comprising:
   a database server retrieving said at least one document from the database in response to a request for that document by an electronic document browser;
   the database server scanning the retrieved document to identify said links;
   the database server modifying the links into a browser format that includes a location of the database server and an identification of the database and the database server, which is recognizable by the document browser; and
   the database server transmitting the retrieved document including said modified links to the browser.

2. A method according to claim 1, wherein said single file comprises an index of the locations of said documents within the file, and said step of retrieving comprises determining the position of the requested document in the file using the index.

3. A method according to claim 1, wherein the database and the browser are coupled via a data communications network.

4. A method according to claim 1, wherein the database and the browser are provided on the same stand-alone computer system.

5. A method according to claim 1, wherein said set of documents are HTML documents stored in a WWW server connected to an Internet by means of http protocol.

6. A method according to claim 1, wherein the documents are HTML documents stored in a stand alone data processing device.

7. A method according to claim 1, wherein the documents including the references are in the form of text documents or files and that said referenced documents are text and/or image and/or sound files or the like.

8. A method according to claim 1, wherein said transformation transforms the links into Uniform Resource Locators (URLs).

9. The method in claim 1, wherein a document server or an external program coupled to the database retrieves said document from the database in response to the browser's request, the method further comprising:
   the document server or external program providing a database list including the single file,
   wherein the browser request is based on a database selected from the list and selection or the single file.

10. The method in claim 1, wherein the document server or external program scans the retrieved document to identify said links.

11. The method in claim 10, wherein the document server or external program transforms the links.

12. The method in claim 11, wherein the document server or external program transmits the retrieved document.

13. A method for browsing documents stored in a database including a set of documents stored electronically as a single file using a single file database syntax, at least one of said documents including references to other documents and/or files in the database, each reference identifying one other document in the database and useable to retrieve said other document from the database, wherein the browsing comprises:
   a database server retrieving a desired document from the database in response to a request for that document by a browser;
   the database server dynamically transforming the references of said retrieved document from the single file database syntax to a browser format said browser is capable of understanding including a location of the database server and an identification of the database and the database server; and
   the database server transmitting the referenced documents and/or files to said browser.

14. The method in claim 13, wherein a document server or an external program coupled to the database retrieves said document from the database in response to the browser's request, the method further comprising:
   the document server or external program providing a database list including the single file,
   wherein the browser request is based on a database selected from the list and selection of the single file.

15. The method in claim 13, wherein the document server or external program transforms the links.

16. The method in claim 15, wherein the document server or external program transmits the retrieved document.

17. The method in claim 15, wherein the document server or external program transmits the retrieved document.

18. A method for browsing documents stored in at least two databases connected to each other for communication, at least one of said documents including references to other documents and/or files in one or both of the databases, each reference identifying one other document in one or both of the databases and useable to retrieve said other document from one or both of the databases, wherein the browsing comprises:
   a database server retrieving of a desired document from at least one of the databases as response to a request for that document by a browser;
   the database server dynamically transforming the references of said retrieved document from a single file database syntax associated with a set of documents being stored as a single file in at least one of the databases to a browser format, said browser format, including a location of the database server and an identification of the database and the database server; and
   the database server transmitting the referenced documents and/or files to said browser.

19. A method according to claim 18, wherein the documents and/or files stored in at least two databases are transmitted to said browser as one unit.

20. The method in claim 18, wherein a document server or an external program coupled to the database retrieves said document from the database in response to the browser's request, the method further comprising:
   the document server or external program providing a database list including the single file,
   wherein the browser request is based on a database selected from the list and selection of the single file.

21. The method in claim 18, wherein the document server or external program transforms the links.

22. An apparatus for browsing documents stored in a database including a set of documents stored electronically as a single file using a single file database format, wherein at least one of said documents to be browsed includes references to other documents and/or files in the database, each reference identifying one other document in the database and useable to retrieve said other document from the database, the arrangement comprising:
   a browser;
   a document server for retrieving a desired document from the database and for modifying the references of said desired document from the single file database syntax to a browser format, said browser format includes a location of the database server and an identification of the database and the database server; and
   the document server configured to transmit said referenced documents and/or files to said browser.

23. An apparatus according to claim 22, wherein the browsed documents are HTML documents stored in a WWW server connected to an Internet by means of a http protocol.

24. An apparatus according to claim 22, wherein the browsed documents are HTML documents stored in a stand alone data processing device.

25. An apparatus according to claim 22, wherein the documents including the references are in the form of text documents or files and that said referenced documents are text and/or image and/or sound files or the like.

26. An apparatus according to claim 22, wherein the document references are in the form of Uniform Resource Locator (URL).

27. An apparatus according to claim 22, wherein the files are arranged to be transmitted and/or handled in a compressed form.

28. The apparatus in claim 22, wherein the means for retrieving is a document server or an external program coupled to the database, and the means for transmitting is the document server or external program.

29. An apparatus for browsing documents stored in at least two databases connected to each other for communication, wherein at least one of said documents to be browsed includes references to other documents and/or files in one or both of the databases, each reference identifying one other document in one or both of the databases and useable to retrieve said other document from one or both of the databases, the arrangement comprising:
   a browser;
   electronic circuitry configured to retrieve a desired document from at least one of the databases and dynamically transform the references of said desired document from a single database file syntax associated with a set of documents, including the at least one document, being stored as a single file in at least one of the databases to a browser format, said browser including a location of the database server and an identification of the database and the database server; and
   a transmitter for transmitting said referenced documents and/or files to said browser.

30. A method according to claim 22, the arrangement being implemented in a network environment or in a stand alone data processing device or in both.

31. The apparatus in claim 29, wherein the electronic circuitry includes a document server or an external program coupled to the database, and the document server or external program includes the transmitter.

32. A method for browsing operation and maintenance documents for telecommunication systems stored in a database including a set of documents stored electronically as a single file using a single file database format, at least one of said documents including references to other documents and/or files in the database, each reference identifying one other document in the database and useable to retrieve said other document from the database, comprising:
   a document server retrieving a desired document from the database in response to a request for that document by a browser,
   the document server dynamically transforming the references of said retrieved document from a single file database syntax to a browser format, said browser including a location of the database server and an identification of the database and the database server, and
   the document server transmitting the referenced documents and/or files to said browser.

33. The method in claim 32, wherein a document server or an external program coupled to the database retrieves said document from the database in response to the browser's request, the method further comprising:
   the document server or external program providing a database list including the single file,
   wherein the browser request is based on a database selected from the list and selection of the single file.

34. The method in claim 32, wherein the document server or external program transforms the links.

35. The method in claim 34, wherein the document server or external program transmits the retrieved document.

* * * * *